United States Patent
Schroeder

(10) Patent No.: US 11,898,931 B2
(45) Date of Patent: Feb. 13, 2024

(54) SYSTEMS AND METHODS FOR DETECTING BEARING FAILURES FOR TOOL ASSEMBLIES OF AGRICULTURAL IMPLEMENTS

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/543,930

(22) Filed: Dec. 7, 2021

(65) Prior Publication Data
US 2023/0175923 A1 Jun. 8, 2023

(51) Int. Cl.
*G01M 13/04* (2019.01)

(52) U.S. Cl.
CPC .................. *G01M 13/04* (2013.01)

(58) Field of Classification Search
CPC .................................................. G01M 13/04
See application file for complete search history.

(56) References Cited

U.S. PATENT DOCUMENTS

| | | | |
|---|---|---|---|
| 3,695,096 A | 10/1972 | Kutsay | |
| 8,700,270 B2 | 4/2014 | Foster et al. | |
| 9,523,631 B2 | 12/2016 | Mizuochi et al. | |
| 10,053,838 B2 | 8/2018 | Kean et al. | |
| 2020/0390023 A1* | 12/2020 | Harmon | A01B 71/02 |
| 2021/0102856 A1 | 4/2021 | Glovier et al. | |
| 2021/0127578 A1* | 5/2021 | Desnijder | A01D 34/60 |

FOREIGN PATENT DOCUMENTS

| | | |
|---|---|---|
| JP | 2010159548 | 7/2010 |
| RU | 2682085 | 3/2019 |

OTHER PUBLICATIONS

Han et al., "Failure Life Prediction of Hub Bearing in Composite Tooling" MDPI, Applied Science, dated Jul. 8, 2020—23 pages.

* cited by examiner

Primary Examiner — Manuel L Barbee
(74) Attorney, Agent, or Firm — Rickard K. DeMille; Rebecca L. Henkel

(57) ABSTRACT

A system for detecting bearing failures for tool assemblies of agricultural implements includes an implement frame and first and second tool assemblies supported relative to the implement frame, with each tool assembly including at least one ground-engaging tool. The system also includes first and second load sensors configured to generate data indicative of the applied loads through the first and second tool assemblies, respectively. Additionally, the system includes a computing system configured to: monitor the loads applied through the tool assemblies based on the data received from the first and second load sensors; and identify that one of the first tool assembly or the second tool assembly is experiencing a bearing failure condition based on an evaluation of the monitored loads applied through the first and second tool assemblies.

17 Claims, 6 Drawing Sheets

SYSTEMS AND METHODS FOR DETECTING BEARING FAILURES FOR TOOL ASSEMBLIES OF AGRICULTURAL IMPLEMENTS

FIELD OF THE INVENTION

The present disclosure generally relates to agricultural implements and, more particularly, to systems and methods for detecting bearing failures for tool assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tool assemblies configured to engage the soil as the implement is moved across the field. For example, in certain configurations, the implement may include one or more disk gang assemblies, leveling disk assemblies, rolling basket assemblies, shank assemblies, and/or the like. Such tool assemblies loosen and/or otherwise agitate the soil to prepare the field for subsequent planting operations.

Rotating tool assemblies, such as disk gang assemblies, basket assemblies, leveling disk assemblies, and the like, typically include one or more bearings that facilitate rotation of at least one component of the rotating tool assembly as an agricultural operation is being performed within the field. Over time, the bearing(s) of a given tool assembly will be subject to wear and tear, which can eventually result in failure of the bearing. Such bearing failures can result in the operation of the associated tool assembly being rendered ineffective or unsuitable for performing its intended function. However, it may be difficult for the operator to determine when a bearing failure has occurred relative to a given tool assembly.

Accordingly, a system and related method for detecting bearing failures for tool assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting bearing failures for tool assemblies of agricultural implements. The system includes an implement frame and first and second tool assemblies supported relative to the implement frame, with each of the first and second tool assemblies including at least one ground-engaging tool. The system also includes a first load sensor configured to generate data indicative of an applied load through the first tool assembly and a second load sensor configured to generate data indicative of an applied load through the second tool assembly. Additionally, the system includes a computing system communicatively coupled to the first and second load sensors, with the computing system being configured to: monitor the loads applied through the first and second tool assemblies based on the data received from the first and second load sensors; and identify that one of the first tool assembly or the second tool assembly is experiencing a bearing failure condition based on an evaluation of the monitored loads applied through the first and second tool assemblies.

In another aspect, the present subject matter is directed to an agricultural implement. The implement includes an implement frame and a plurality of disk gang assemblies supported relative to the implement frame, with each disk gang assembly including a toolbar coupled to the implement frame and a plurality of disks supported by the toolbar. The implement further includes a first load sensor configured to generate data indicative of an applied load through a first disk gang assembly of the plurality of disk gang assemblies, and a computing system communicatively coupled to the first load sensor. The computing system is configured to: monitor the load applied through the first disk gang assembly based on the data received from the first load sensor; evaluate the monitored load relative to a predetermined load threshold associated at least in part with the first disk gang assembly; and identify that the first disk gang assembly is experiencing a bearing failure condition based at least in part on the evaluation of the monitored load relative to the load threshold.

In a further aspect, the present subject matter is directed to a method for detecting bearing failures for tool assemblies of agricultural implements. The method includes monitoring, with a computing system, a load applied through a first tool assembly of an agricultural implement as the agricultural implement is being moved through a field during the performance of an agricultural operation; evaluating, with the computing system, the monitored load relative to a predetermined load threshold associated at least in part with the first tool assembly; and identifying, with the computing system, that the first tool assembly is experiencing a bearing failure condition based at least in part on the evaluation of the monitored load relative to the load threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
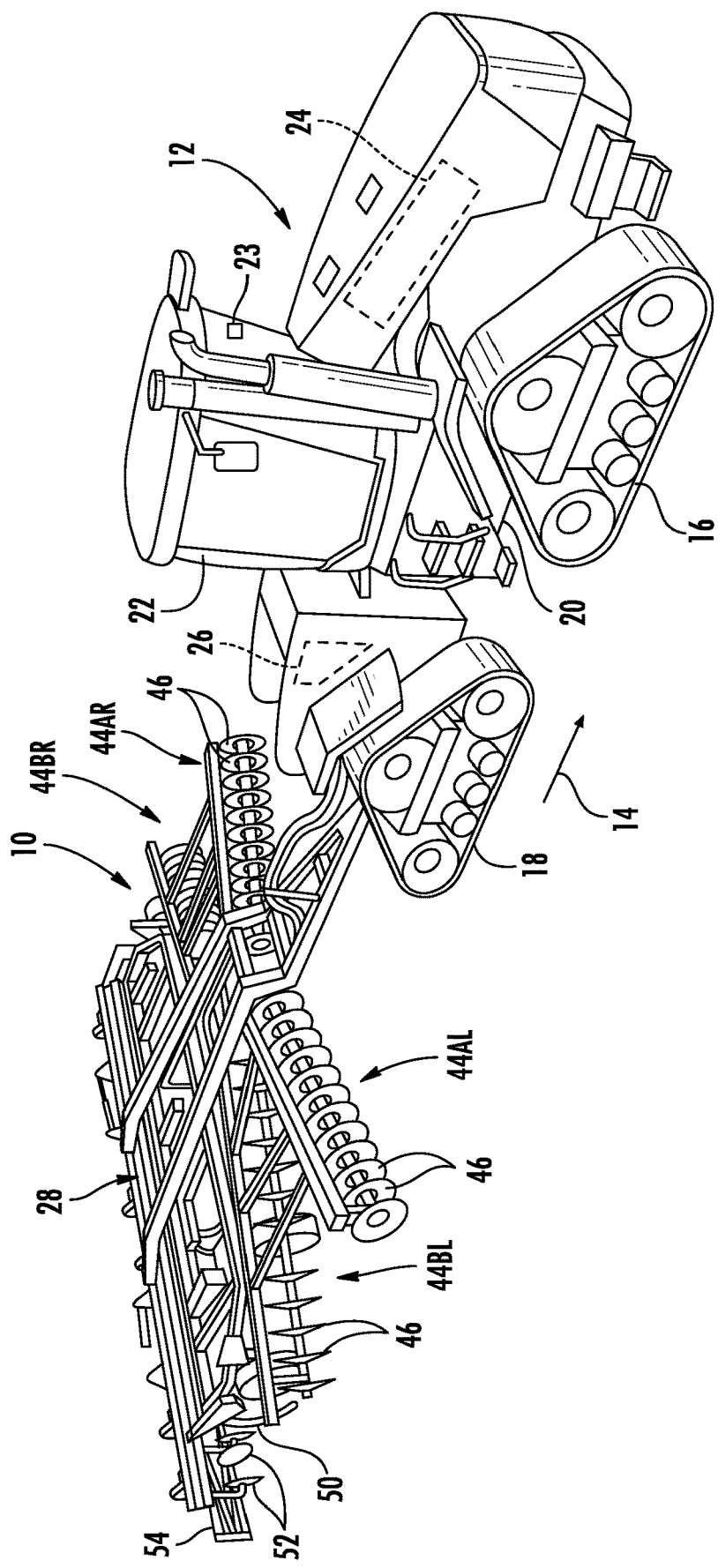
FIG. 1 illustrates a perspective view of one embodiment of an agricultural implement in accordance with aspects of the present subject matter, particularly illustrating the implement being towed by a work vehicle.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for detecting bearing failures for tool assemblies of an agricultural implement. In several embodiments, a computing system may be configured to monitor an applied load through a tool assembly to determine or infer when the tool assembly is experiencing a bearing failure condition. Specifically, the monitored load may be compared to an applicable load threshold/range and, when the monitored load differs from the threshold/range (e.g., by exceeding the threshold and/or by falling outside the range), the computing system may determine or infer that the corresponding tool assembly is experiencing a bearing failure condition. Upon making such a determination, the computing system may be configured to automatically initiate a control action, such as by generating an operator notification and/or automatically adjusting the operation of the implement.

Figure 2:
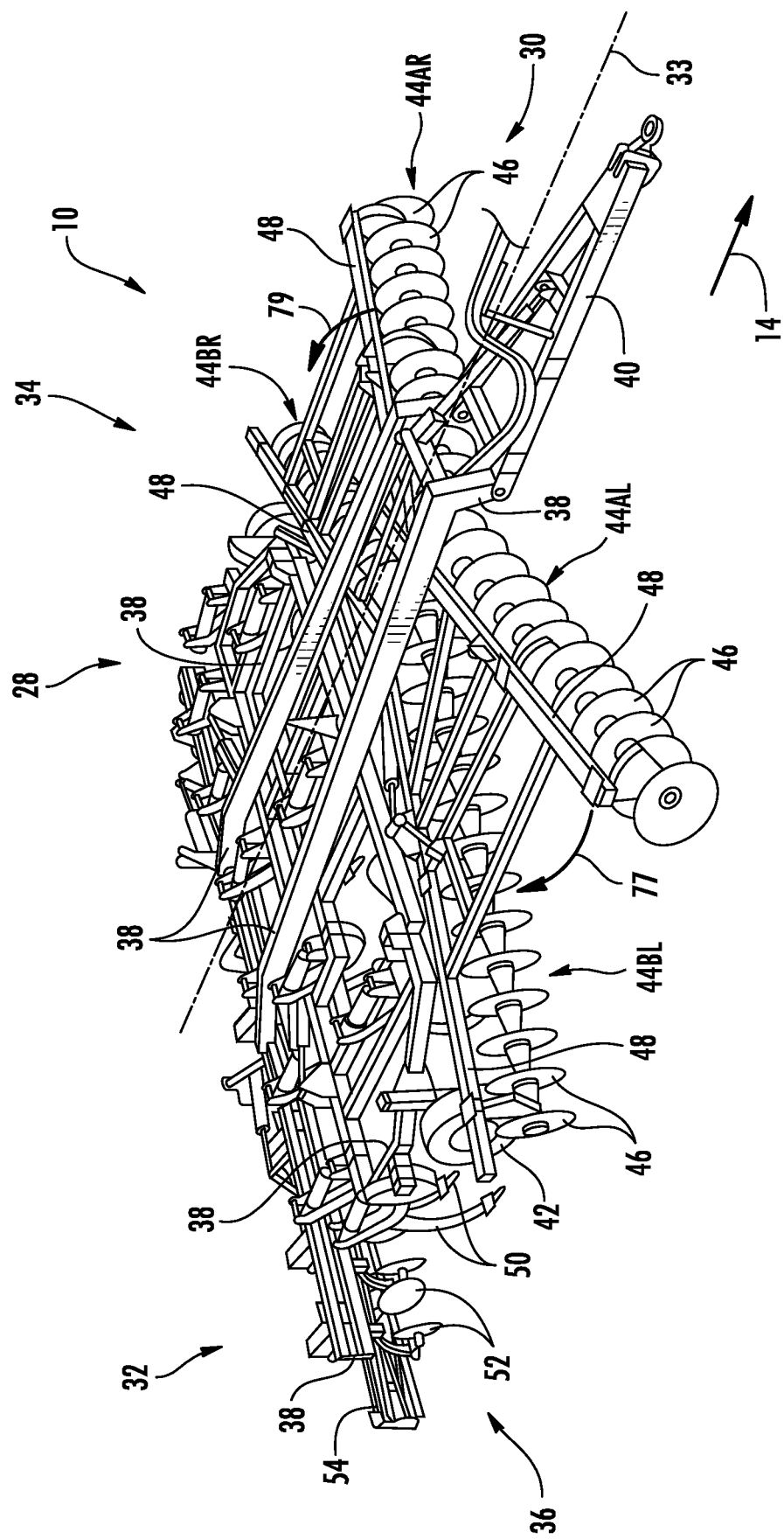
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair of rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first lateral side 34 (e.g., a right side of the implement 10) and a second lateral side 36 (e.g., a left side of the implement 10), with a longitudinal centerline 33 of the implement frame 28 extending in the longitudinal direction between the forward and all ends 30, 32 and generally dividing the first lateral side 34 from the second lateral side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tool assemblies. For instance, the frame 28 may support one or more disk gang assemblies 44. As illustrated in FIG. 2, each disc gang assembly 44 includes a toolbar 48 coupled to the implement frame 28 and a plurality of harrow disks 46 supported by the toolbar 48 relative to the implement frame 28. Each harrow disk 46 may, in turn, be configured to penetrate into or otherwise engage the soil as the implement 10 is being pulled through the field. As is generally understood, the various disk gang assemblies 44 may be oriented at an angle relative to the direction of travel 14 to promote more effective tilling of the soil. In the embodiment shown in FIGS. 1 and 2, the implement 10 includes four disk gang assemblies 44 supported relative to the frame 28 at a location forward of the remainder of the ground-engaging tools. Specifically, the implement 10 includes a pair of front disk gang assemblies 44A (e.g., a left front disk gang assembly 44AL and a right front disk gang assembly 44AR) and a pair of rear disc gang assemblies 44B (e.g., a left rear disk gang assembly 44BL and a right rear disk gang assembly 44BR) positioned aft or rearward of the front disk gang assemblies 44A relative to the direction of travel 14 of the implement 10, with the right-side disk gang assemblies 44AR, 44BR being positioned on the right or first lateral side 34 of the implement 10 and the left-side disk gang assemblies 44AL, 44BL being positioned on the left or second lateral side 36 of the implement 10. It should be appreciated that, in alternative embodiments, the implement 10 may include any other suitable number of disk gang assemblies 44, such as more or less than four disk gang assemblies 44. Furthermore, in one embodiment, the disk gang assemblies 44 may be mounted to the frame 28 at any other suitable location, such as adjacent to its aft end 32.

Additionally, as shown, in one embodiment, the implement frame 28 may be configured to support other ground-engaging tool assemblies. For instance, in the illustrated embodiment, the frame 28 is configured to support a plurality of shank assemblies 50 configured to rip or otherwise till the soil as the implement 10 is towed across the field. Furthermore, in the illustrated embodiment, the frame 28 is also configured to support one or more finishing tool assemblies, such as a plurality of leveler disk assemblies 52 and/or rolling (or crumbler) basket assemblies 54. However, in other embodiments, any other suitable ground-engaging tool assemblies may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
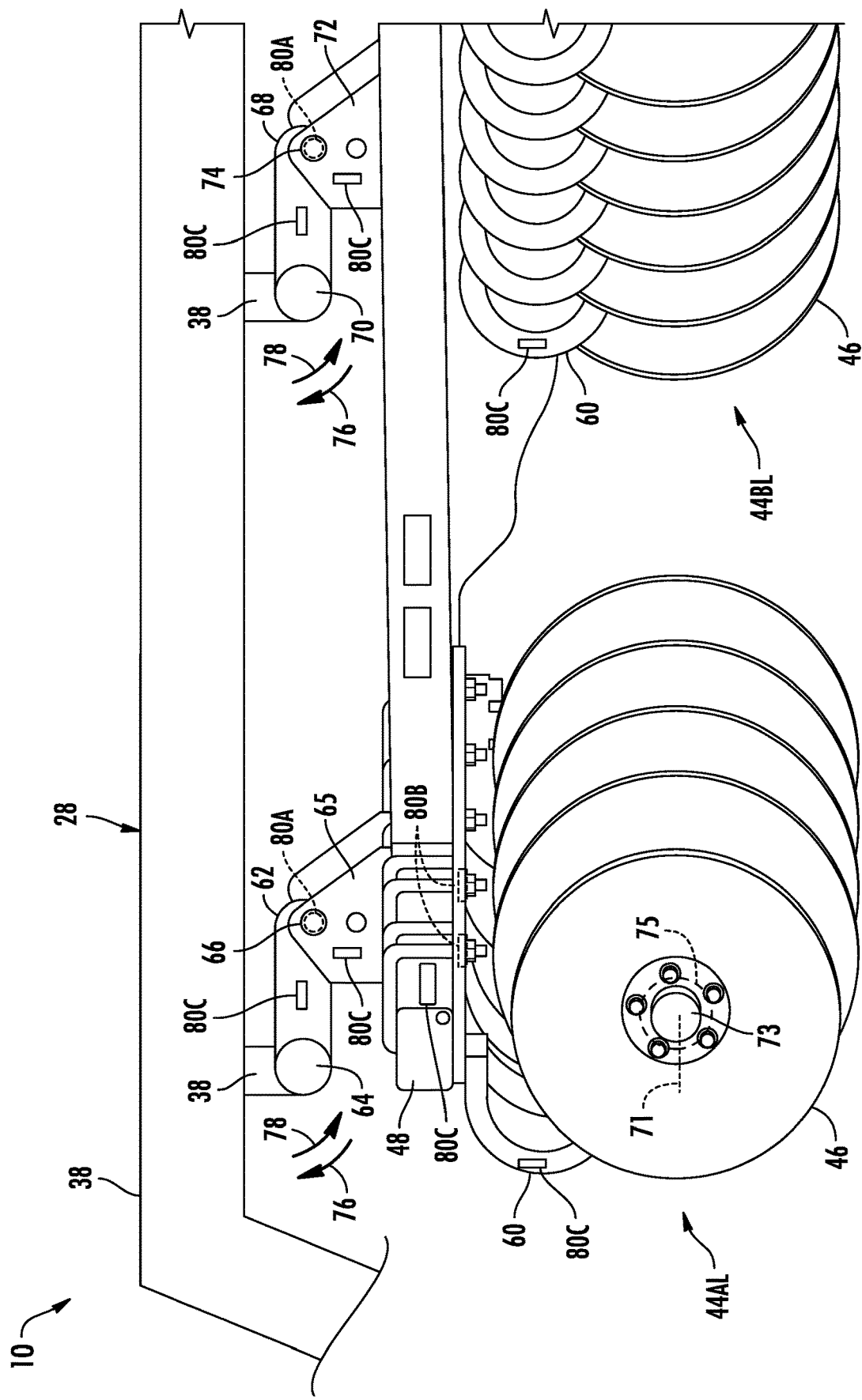
FIG. 3 illustrates a side view of a portion of the agricultural implement shown in FIGS. 1 and 2, particularly illustrating portions of two disk gang assemblies of the implement in accordance with aspects of the present subject matter.

Referring now to FIG. 3, a side view of a portion of the implement 10 described above with reference to FIGS. 1 and 2 is illustrated in accordance with aspects of the present subject matter, particularly illustrating a side view of portions of the left-side front and rear disk gang assemblies 44AL, 44BL of the implement 10. As indicated above, each disc gang assembly 44 may include a plurality of harrow disks 46 supported relative to a toolbar 48, such as via a plurality of hangers 60 (e.g., C-hangers). The toolbar 48 of each disk gang assembly 44A, 44B is, in turn, configured to be coupled to the implement frame 28.

For instance, as shown in FIG. 3, the toolbar 48 of the front disk gang assembly 44AL is coupled to an adjacent frame member 38 of the implement frame 28 via a front support arm 62 and a front rockshaft 64 of the implement 10. Specifically, a first end of the forward support arm 62 is coupled to a corresponding gang bracket 65 (e.g., via a bolt or pin 66), which is, in turn, coupled to a portion of the toolbar 48 of the front disk gang assembly 44AL. Additionally, an opposed, second end of the forward support arm 62 is coupled to the front rockshaft 64, which is, in turn, rotatably coupled to an adjacent frame member 38 of the implement frame 28. Similarly, as shown in FIG. 3, the toolbar 48 (not shown in FIG. 3) of the rear disk gang assembly 44B is coupled to the adjacent frame member 38 of the implement frame 28 via a rear support arm 68 and a rear rockshaft 70 of the implement 10. Specifically, a first end of the rear support arm 68 is coupled to a corresponding gang bracket 72 (e.g., via a bolt or pin 74), which is, in turn, coupled to a portion of the toolbar 48 (not shown) of the rear disk gang assembly 44B. Additionally, an opposed, second end of the rear support arm 68 is coupled to the rear rockshaft 70, which is, in turn, rotatably coupled to the adjacent frame member 38 of the implement frame 28.

In several embodiments, rotation of each rockshaft 64, 70 in a first direction (e.g., as indicated by arrow 76 in FIG. 3) adjusts the position of the disk gang assemblies 44 relative to the implement frame 28 such that the penetration depth of the disk blades 46 is increased. Similarly, rotation of each rockshaft 64, 70 in an opposite, second direction (e.g., as indicated by arrow 78 in FIG. 3) adjusts the position of the disk gang assemblies 44 relative to the implement frame 28 such that the penetration depth of the disk blades 46 is decreased. It should be appreciated that the rotation of each rockshaft 64, 70 may be controlled via a suitable actuator (not shown) (e.g., a fluid-driven actuator, such as a hydraulic cylinder) coupled between the rockshaft 64, 70 and the implement frame 28.

Additionally, as is generally understood, the disks 46 of each disk gang assembly 44 may generally be supported for rotation along a common rotational axis 71. To facilitate such rotation, each disk gang assembly 44 includes a disk gang shaft 73 (also referred to herein as a common gang shaft) extending axially along the rotational axis 71 through each of the disks 46 (e.g., through a central opening defined in each disk 46) and one or more bearings 75 for rotationally supporting the disks 46 for rotation about the rotational axis 71. For instance, in one embodiment, each disk 46 may be rotatably coupled or keyed to the disk gang shaft 73 by a bearing 75. Thus, with each disk gang assembly 44 positioned at its lowered or working position, the disks 46 of the assembly 44 may be configured to penetrate the soil surface of the field and rotate about the respective rotational axis 71 relative to the soil within the field. As the implement 10 is moved across a field, the bearings 75 of each disk gang assembly 44 are typically subject to varying loading conditions as the disks 46 penetrate the soil surface and rotate about the respective rotational axis 71 of the assembly 44, particularly as the disks 46 encounter differing soil conditions and objects within the soil (e.g., rocks, roots, etc.). Such variable loading leads to wear and tear on the bearings 75, which can eventually result in failure of one or more of the bearings 75.

Bearing failure typically occurs over an extended period of time, with the bearing(s) 75 transitioning over time from a normal, fully operational condition to a complete failure condition. During this transition process, the rotational speed of the disks 46 is generally reduced relative to an otherwise expected rotational speed of the disks 46 (i.e., an expected rotational speed for a given implement ground speed when the bearings are in their fully operational condition). For instance, the rotational speed of the disks 46 may generally vary as a function of the condition of the bearing(s) 75, with the speed decreasing from the expected rotational speed as the bearing(s) 75 transitions towards complete failure. This reduction in the rotational speed of the disks 46 results in a change in the loading applied through the respective disk gang assembly 44, particularly relative to the other disk gang assemblies 44 of the implement 10. For instance, the reduction in the disk rotational speed often leads to an increase in the draft loads applied through the associated disk gang assembly 44 relative to the other disk gang assemblies 44.

As such, by monitoring the loads applied through a given disk gang assembly 44 during the performance of a tillage operation, it may be inferred or determined when the gang assembly 44 is experiencing a bearing failure condition (including a complete failure condition of the bearing 75 and/or a partial failure condition as the bearing 75 transitions between its fully operational condition and its complete failure condition). For example, the loads applied through a gang assembly 44 generally vary as a function of the ground speed of the implement 10 and the penetration depth of the disks 46, and this relationship can be used to establish an expected or baseline load range for each gang assembly 44 at various combinations of speed/depth settings (e.g., via a look-up table and/or algorithm). In such an embodiment, by monitoring the load applied through a given disk gang assembly 44 relative to a predetermined load threshold for the draft load range associated with the current ground speed and depth setting, it can be inferred or determined when the disk gang assembly 44 is experiencing a bearing failure condition, such as when the monitored load exceeds a maximum load threshold associated with the expected or baseline load range.

In addition to such threshold-based load monitoring (or as an alternative thereto), the monitored load applied through a given disk gang assembly 44 of an agricultural implement 10 may be compared to the monitored load applied through another disk gang assembly 44 of the implement 10 to determine or infer a bearing failure condition for one of such gang assemblies 44. For example, it may generally be expected that similarly positioned gang assemblies 44 will experience similar loading conditions (even through the magnitude of the loads may vary, such as between the front and rear disk gang assemblies 44A, 44B). Thus, an expected or baseline load differential range may be established at various combinations of speed/depth settings for each pair of similarly positioned gang assemblies 44 (e.g., the left-side gang assemblies 44AL, 44BL vs the right-side gang assemblies 44AR, 44BR or the front gang assemblies 44A vs the rear gang assemblies 44B) that can be used to identify when one of the disc gang assemblies 44 of such pair(s) is likely experiencing a bearing failure condition. In such an embodiment, when the load differential between the disk gang assemblies 44 for a given pair of gang assemblies 44 falls outside the expected or baseline load differential range set for such pair, it may be inferred that one of the gang assemblies 44 in the pair is experiencing a hearing failure condition. The individual loads for each of such disk gang assemblies 44 may then be reviewed to identify which gang assembly 44 has caused the load differential to fall outside the predetermined range (e.g., due to an increase in the loads being applied through one of the disk gang assemblies 44). For instance, the loads applied through the left front disk gang assembly 44AL may be continuously compared to the loads applied through the left rear disk gang assembly 44BL to determine a load differential between this pair of gang assemblies, which can then be compared to a predetermined load differential range set for such pair (e.g., a load differential range selected based on the current ground speed of the implement 10 and the current disk penetration depth). In the event that the load differential between the gang assemblies 44AL, 44BL falls outside the predetermined load differential range, it may be inferred that the gang assembly in which there has been an increase in loading (e.g., over a given period time) is likely experiencing a bearing failure condition, particularly if the load applied through the gang assembly has increased over time in a manner that would be indicative of the associated bearing(s) transitioning from its fully operational state or condition to a complete failure state or condition.

Moreover, given the typical mounting configuration for disk gang assemblies 44, the increase in loading applied through one of the disk gang assemblies 44 will result in a moment being applied about one or more joints or connection points for the assembly 44 (including at the connection of the assembly 44 to the frame 28), the direction of which will vary depending on which side of the implement 10 the disk gang assembly 44 is installed. For instance, referring briefly back to FIG. 2, assuming that the implement 10 is being viewed from its front side 30, a bearing failure in either of the left-side disk gang assemblies 44AL, 44BL will result in a clockwise moment being applied about one or more joints or connection points for the assembly 44 (e.g., as indicated by arrow 77 in FIG. 2) as the failure results in an increase in the draft load applied through such assembly 44. Similarly, a bearing failure in either of the right-side disk gang assemblies 44AR, 44BR will result in a counter-clockwise moment being applied about one or more joints or connection points for the assembly 44 (e.g., as indicated by arrow 79 in FIG. 2) as the failure results in an increase in the draft load applied through such assembly 44. Thus, by determining the direction of the moment caused by the increase in load applied through a given disk gang assembly 44 (e.g., due to an alleged bearing failure condition), one can identify the side of the machine 10 along which such failure is occurring. For instance, if it is detected that the implement frame 28 is now subject to a clockwise moment, it may be determined that a potential bearing failure is occurring along the left side of the machine (e.g., the second lateral side 36 of the implement 10). The loads applied through the left-side disk gang assemblies 44AL, 44BL can then be assessed to determine if the front or rear left-side gang assembly is experiencing a potential bearing failure condition.

It should be appreciated that, in one embodiment, the direction of the moment may be calculated by summing all of the moments applied on the disk gang assemblies 44 (e.g., as determined based on the product of the monitored load and the moment arm), with positive/negative directional indicators being associated with clockwise and counter-clockwise moments. For instance, in one embodiment, clockwise moments may be assigned a positive value, while counter-clockwise moments may be assigned a negative value. Thus, if the summation of the applied moment is negative, it may be determined that the direction of the overall movement applied through the implement 10 is in the counter-clockwise direction, which is indicative of a potential bearing failure occurring along the right side of the machine.

In several embodiments, the load applied through each disk gang assembly 44 may be monitored using one or more load sensors 80 provided in operative association with the disk gang assembly 44 and/or other components of the implement 10. In general, the load sensor(s) 80 may correspond to any suitable sensing device or system configured to provide or generate data directly or indirectly indicative of the load applied through the associated disk gang assembly 44. For example, the load sensor(s) 80 may correspond to one or more load pins, load cells, piezoelectric or strain gauge sensors, and/or any other suitable sensing devices.

Several examples of different types of load sensors 80 that can be used to directly or indirectly monitor the applied load through a disk gang assembly 44 and/or different installation locations for such load sensor(s) 80 is shown in FIG. 3. In one embodiment, the load sensor(s) 80 may correspond to one or more load pins or load cells provided at one or more associated connection points between the toolbar 48 of the disk gang assembly 44 and the main implement frame 28. For instance, as shown in FIG. 3, the bolts/pins 66, 74 connecting each gang bracket 65, 72 to an associated support arm (e.g., the front support arm 62 or the rear support arm 68) are configured as load pins 80A. In such an embodiment, each load pin 80A may be configured to generate data associated with the load applied through such joint/connection point, which, in turn, is indicative of the draft load on the disk gang assembly 44. Alternatively, the load sensor(s) 80 may correspond to one or more load cells (e.g., donut load cells) provided around the attachment bolts/pins at the connection points. For instance, as shown in FIG. 3, one or more load cells 80B may be provided in association with the bolts (e.g., U-bolts) used to couple the hangers 60 to the toolbar 48. In another embodiment, the load sensor(s) 80 may correspond to one or more strain gauges provided in operative association with one or more components of each disk gang assembly 44 and/or other components of the implement 10. For instance, as shown in FIG. 3, one or more strain gauges 80C may be installed on each disk gang assembly 44 (e.g., on the toolbar 48, hangers 60, and/or the gang bracket 65, 72) and/or on adjacent components of the implement 10 (e.g., the support arm 62, 68 and/or an adjacent frame member 38) to monitor the load applied through each disk gang assembly 44. In such an embodiment, by detecting the strain applied through a component of the disk gang assembly 44 and/or an adjacent component of the implement 10, the associated draft load on the disk gang assembly 44 can be determined. In further embodiments, the load sensor(s) 80 may correspond to any other suitable sensing device or system and/or may be provided in operative association with any other suitable component so as to provide an indication of the applied load through each disk gang assembly 44.

Figure 4:
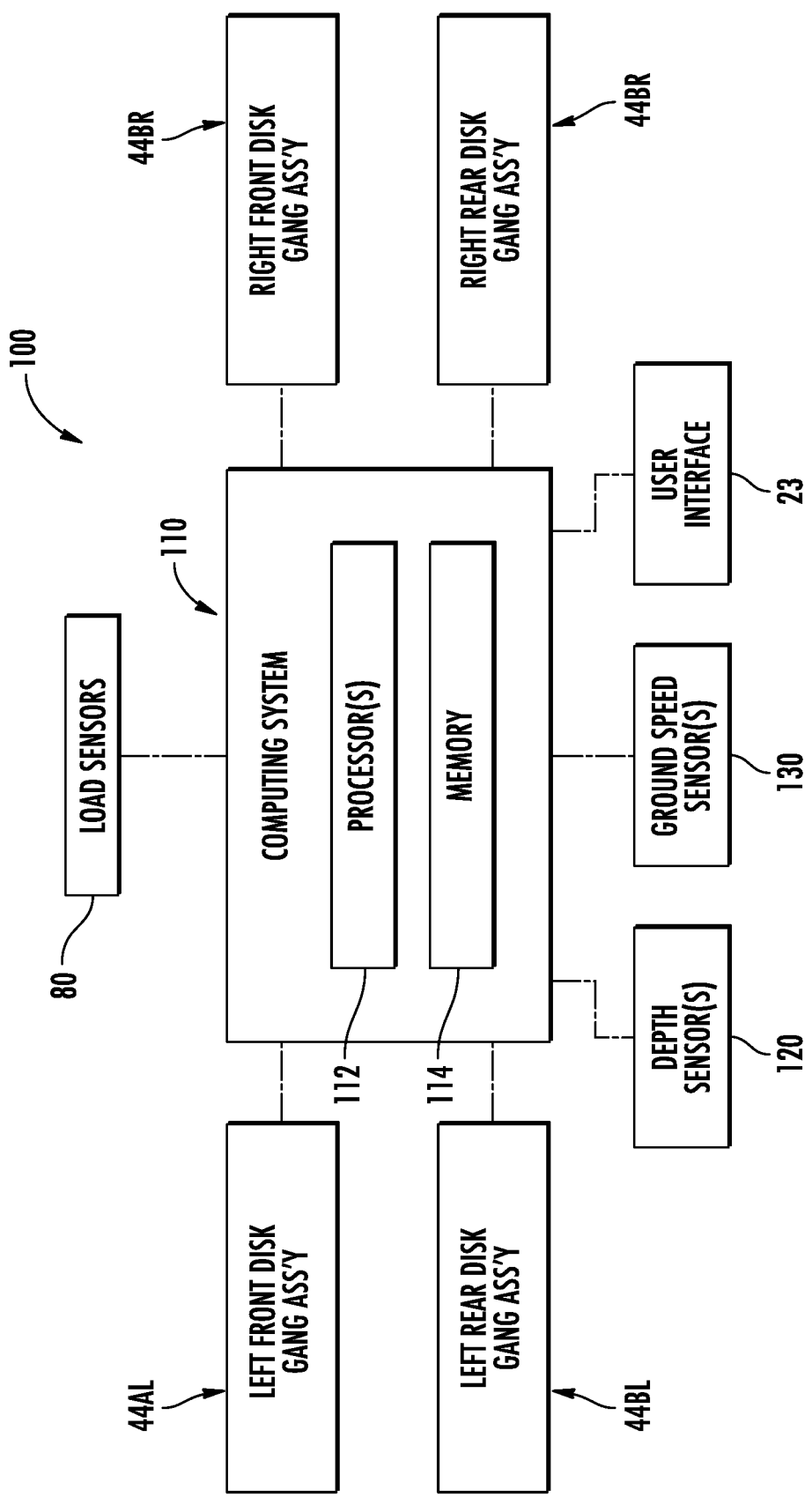
FIG. 4 illustrates a schematic view of one embodiment of a system for detecting bearing failures for tool assemblies of an agricultural implement in accordance with aspects of the present subject matter.

Referring now to FIG. 4, a schematic view of one embodiment of a system 100 for detecting bearing failures of tool assemblies of an agricultural implement is illustrated in accordance with aspects of the present subject matter. In general, the system 100 will be described herein with reference to the implement 10 and related disk gang assemblies 44 described above with reference to FIGS. 1-3. However, it should be appreciated by those of ordinary skill in the art that the disclosed system 100 may generally be utilized with agricultural implements having any other suitable implement configuration and/or with disk gang assemblies having any other suitable gang configuration. Additionally, although the system 100 will generally be described with reference to disk gang assemblies, the system 100 may generally be used to detect bearing failures associated with any other tool assemblies that include or incorporate bearings, such as basket assemblies, leveler disk assemblies, and/or any other suitable rotating tool assemblies.

In general, the system 100 may include one or more components of an agricultural implement, such as one or more of the components of the implement 10 described above. For example, as shown in FIG. 4, the system 100 may include one or more disk gang assemblies 44, such as one or more of the front disk gang assemblies 44AL, 44AR and/or one or more of the rear disk gang assemblies 44BL, 44BR of the implement 10. Each disk gang assembly 44 and/or other components of the implement 10 may generally be provided in operative association with one or more load sensors (e.g., the load sensors 80 described above) configured to provide data indicative of the load applied through the disk gang assembly 44. For instance, as described above, one or more load pins 80A may be provided at the joints or connections between the toolbar 48 of a given disk gang assembly 44 and the main implement frame 28. In addition to such load pin(s) 80A (or as an alternative thereto), one or more load cells 80B and/or strain gauges 80C may be provided in association with the disk gang assembly 44 to allow the applied load through the assembly 44 to be monitored.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the load applied through each disk gang assembly 44 relative to an associated load threshold. Specifically, in one embodiment, the computing system 110 may be communicatively coupled to the load sensor(s) 80 (e.g., via a wired or wireless connection) to allow the applied load through such assembly(ies) 44 to be monitored. The monitored load may then be compared to the associated load threshold selected based on the current ground speed of the implement 10 and the current depth setting of the disks 46 to determine or infer whether the corresponding gang assembly 44 is currently experiencing a bearing failure condition.

For example, in one embodiment, the load threshold may correspond to a maximum load threshold for an anticipated or expected load range for the disk gang assembly 44 given the current ground speed of the implement 10 and the current depth setting of the disks 46. In such an embodiment, the computing system 110 may be configured to determine or infer that the bearings 75 of the corresponding disk gang assembly 44 are in an acceptable operating state when the monitored load is at or below the load threshold and that the disk gang assembly 44 is experiencing a bearing failure condition when the monitored load exceeds the load threshold. In another embodiment, the load threshold may form part of a predetermined load differential range associated with an anticipated or expected load differential range between two disk gang assemblies 44 (e.g., given the current ground speed of the implement 10 and the current depth setting of the disks 46). In such an embodiment, the computing system 110 may be configured to determine or infer that the disk gang assembly 44 subject to an increased load is experiencing a bearing failure condition when the load differential between the two disk gang assemblies 44 exceeds the predetermined load differential range.

As indicated above, the load threshold (and/or load differential range) selected for evaluating the operational status of the bearings 75 of a disk gang assembly 44 may generally vary as a function of ground speed and disk penetration depth. Thus, in several embodiments, the computing system 110 may be configured to calculate or select an applicable load threshold value (and/or load differential range) based on the current ground speed of the implement 10 and the current penetration depth of the disks 46. To account for variations in the ground speed and/or the penetration depth, the computing system 110 may be configured to utilize one or more look-up tables and/or mathematical relationships to select an appropriate loading threshold (and/or load differential range). For instance, in one embodiment, the computing system 110 may include a look-up table or mathematical relationship that correlates threshold values for the load threshold (and/or load differential ranges) to the ground speed of the implement 10, thereby allowing the computing system 110 to select an initial threshold value (and/or load differential range) based on the current ground speed of the implement 10. Such initial threshold value (and/or load differential range) may then be adjusted or corrected (e.g., up or down), as necessary, based on the current penetration depth of the disk blades 46 (e.g., by scaling or adjusting the initial value/range based on a known relationship between the penetration depth and the threshold values/ranges). In another embodiment, the computing system 110 may include a plurality of ground-speed-dependent look-up tables or mathematical relationships (e.g., one for each of a plurality of different ground speeds) that correlates threshold values for the loading threshold (and/or load differential range) to penetration depths of the disks 46 at each ground speed, thereby allowing the computing system 110 to select an appropriate threshold value/range as a function of the penetration depth and ground speed. In such an embodiment, the computing system 110 may be configured to use suitable interpolation techniques to calculate a threshold value/range when the current ground speed is between two reference ground speeds for which look-up tables and/or mathematical expressions are stored within the computing system's memory 114.

Referring still to FIG. 4, to select the applicable loading threshold and/or differential range, the computing system 110 may generally be configured to receive an input associated with the current penetration depth of the disks 46. In one embodiment, this input may be received from the operator. For instance, the operator may select or input the desired or current penetration depth setting via the user interface 23 provided within the cab 22 of the work vehicle 12. Alternatively, the computing system 110 may be configured to actively monitor the current penetration depth of the disk blades 46 via sensor feedback provided by one or more depth sensors 120. For example, in one embodiment, each depth sensor(s) 120 may correspond to a pressure sensor or position sensor provided in operative association with a corresponding disk gang actuator(s) (not shown) of the implement 10. In such an embodiment, the sensor(s) may be configured to monitor the extent to which the actuator(s) has been extended/retracted, thereby allowing the computing system 110 to determine or infer the penetration depth of the disks 46 based on the extended/retracted state of the actuator(s). In another embodiment, each depth sensor(s) 120 may correspond to a position sensor (e.g., a rotary or linear potentiometer) configured to monitor the relative position between the toolbar 48 of the corresponding disk gang assembly 44 and the implement's main frame 28, thereby allowing the computing system 110 to determine or infer the penetration depth of the disks 46 based on such position data. In even further embodiments, the computing system 110 may be communicatively coupled to any other suitable depth sensor(s) or feedback device(s) that allows the computing system 110 to directly or indirectly monitor/infer the penetration depth of the disks 46.

Additionally, as shown in FIG. 4, to allow the computing system 110 to monitor the ground speed of the implement 10, the computing system 110 may be communicatively coupled to one or more ground speed sensors 130. In general, the ground speed sensor(s) 130 may correspond to any suitable sensing device or system that is configured to provide data indicative of the ground speed of the implement 10. For instance, in one embodiment, the ground speed sensor 130 may correspond to a GPS device or any other suitable satellite navigation position system configured to generate data associated with the ground speed of the implement 10. In another embodiment, the ground speed sensor(s) 130 may correspond to a rotary speed sensor(s) configured to monitor the rotational speed of a given component that provides an indication of the ground speed of the implement 10, such as the engine 24 or transmission 26 of the work vehicle 12 or a wheel of the vehicle 12 or implement 10.

It should be appreciated that, in several embodiments, the specific loading threshold value selected for a given disk gang assembly 44 may differ from the threshold value selected for a different disk gang assembly 44 of the implement 10. Specifically, in many instances, the draft loads on the rear disk gang assemblies 44B may be significantly less than the draft loads on the front disk gang assemblies 44A independent of ground speed and penetration depth. As such, the threshold selected for the front disk gang assemblies 44A (e.g., the max load threshold or the load differential threshold) may differ from the threshold selected for the rear disk gang assemblies 44B (e.g., the max load threshold or the load differential threshold) to accommodate the expected or anticipated difference in the draft loading between such gang assemblies. Such expected difference in loading between the front and rear disk assemblies 44A, 44B may also be taken into account when selecting the load differential range to be used when comparing the left-side disk gang assemblies 44AL, 44BL or the right-side disk gang assemblies 44AR, 44BR to determine if one of such gang assemblies is experiencing a bearing failure condition.

As indicated above, when the one of the disk gang assemblies 44 begins to experience a bearing failure condition, the associated increase in loading that is applied through such disk gang assembly 44 as its disks 46 begin slow to down will result in a moment being applied about one or more joints or connection points for the assembly 44 (including at the connection of the assembly 44 to the frame 28), the direction of which will vary depending on which side of the implement 10 the disk gang assembly 44 is installed. Thus, by determining the direction of the moment applied through the implement 10, one can identify the side of the machine along which a potential bearing failure is occurring. For instance, as described above, if it is detected that the implement frame 28 is subject to a clockwise moment, it may be determined that a potential bearing failure is occurring along the left or second lateral side 36 of the machine. Similarly, if it is detected that the implement frame 28 is subject to a counter-clockwise moment, it may be determined that a potential bearing failure is occurring along the right or first lateral side 34 of the machine. The loads applied through the left-side or right-side disk gang assemblies (as appropriate) can then be assessed to determine if the front or rear gang assembly along the identified lateral side of the machine is experiencing a potential bearing failure condition.

For instance, assuming it is detected that the implement frame 28 is subject to a clockwise moment and, thus, a potential bearing failure is occurring along the left or second lateral side 36 of the machine, the loads applied through the left-side disk gang assemblies 44AL, 44BL may be compared to determine a load differential between such assemblies. The determined load differential can then be compared to the expected or baseline load differential range selected for the left-side gang assemblies 44AL, 44BL (e.g., based on the current ground speed and depth setting) to confirm that one of the disc gang assemblies of such pair(s) is likely experiencing a bearing failure condition. Specifically, when the load differential between the disk gang assemblies falls outside the expected or baseline load differential range, it may be inferred that one of such gang assemblies is experiencing a bearing failure condition. The individual loads for each of the disk gang assemblies may then be reviewed to identify which gang assembly has caused the load differential to fall outside the predetermined range (e.g., due to an increase in the loads being applied through one of the disk gang assemblies). For instance, if either the left-side front disk gang assembly 44AL or the left-side rear disk gang assembly 44BL recently experienced an increase in loading that resulted in the load differential between such disk gang assemblies 44AL, 44BL falling outside the predetermined range, the disk gang assembly subject to such increased loading may be identified as the gang assembly that is experiencing the bearing failure condition.

Figure 5:
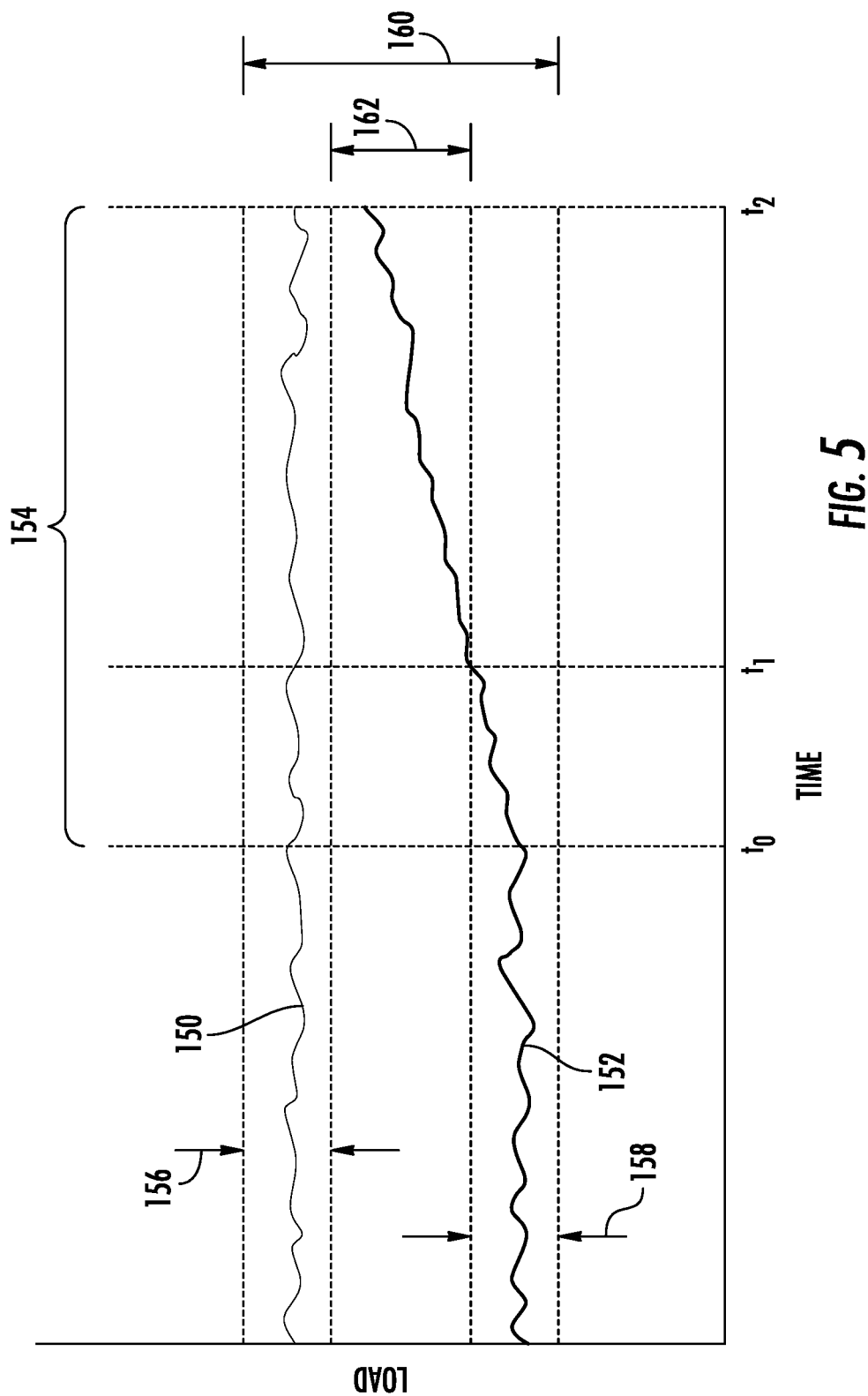
FIG. 5 illustrates an example data plot showing the applied loads over time through a pair of left-side or right-side disk gang assemblies of an agricultural implement when one of such disk gang assemblies is experiencing a bearing failure condition in accordance with aspects of the present subject matter.

Referring briefly to FIG. 5, an example data plot showing the loads applied through a pair of left-side or right-side disk gang assemblies over a given period of time is illustrated in accordance with aspects of the present subject matter, with load line 150 showing the data trace for the front disk gang assembly of such pair and load line 152 showing the data trace for the rear disk gang assembly of such pair. In particular, FIG. 5 shows an instance in which the rear disk gang assembly is experiencing a bearing failure condition. As indicated above, bearing failures typically occur over an extended period of time as the failing bearing(s) 75 transitions from a fully operational condition to a complete failure condition. During such transition, the rotational speed of the disks 46 of the gang assembly 44 often gradually or steadily slows down with further wear and tear of the bearing(s) 75, which results in gradual or steady increase in the applied load through the disk gang assembly 44 over the applicable time period. For instance, in the illustrated embodiment, the average applied load 152 through the rear disk gang assembly steadily increases over a bearing failure period 154 (e.g., from time to $t_0$ time $t_2$) as the bearings) 75 of such gang assembly 44 transition from the fully operational condition to the complete failure condition.

As indicated above, to detect such bearing failure, different detection methodologies may be employed (either individually or in combination). For instance, each disk gang assembly 44 may have an anticipated or expected draft load range given the current ground speed of the implement 10 and the current depth setting of the disks 46, such as an expected load range 156 for the front gang assembly and an expected load range 158 for the rear gang assembly. The expected load ranges generally provide minimum and maximum load thresholds between which the loads applied through the respective gang assembly 44 are generally expected to be maintained during the execution of an associated field operation (e.g., a tillage operation). As such, when it is detected that the loads applied through one of the gang assemblies have exceeded the maximum load threshold associated with the expected load range for such gang assembly, it may be determined that the gang assembly is experiencing a bearing failure condition, particularly if the loads continue to remain above the maximum load threshold. For instance, as shown in FIG. 5, the loads applied through the rear disk gang assembly exceeded the maximum load threshold associated with the respective expected load range 158 at a given time ($t_1$) and then remained above such threshold for the remainder of the bearing failure period 154. Specifically, consistent with a bearing failure condition, the average applied load for the rear gang assembly continued to steadily increase from time $t_1$ as the bearing(s) 75 for the gang assembly 44 further transitioned towards the complete failure condition (e.g., at time $t_2$).

In addition to such individual threshold-based determinations (or as an alternative thereto), the bearing failure of the rear gang assembly may also be detected by determining the load differential between such gang assembly and a similarly situated disk gang assembly (e.g., the front disk gang assembly positioned on the same lateral side of the implement) and comparing such load differential to a predetermined load differential range selected for the associated pair of disk gang assemblies. For instance, in the illustrated embodiment, an expected load differential range may be identified for the front and rear disk gang assemblies (e.g., given the current speed and depth setting), which provides a maximum load differential 160 for the gang assemblies and a minimum load differential 162 for the gang assemblies. In the illustrated example, since the rear disk gang assembly is typically subjected to lower loads than the front disk gang assembly and has experienced a significant increase in loading relative to the front disk gang assembly, the load differential between the gang assemblies has dropped below the minimum load differential 162 for the expected load differential range, thereby indicating that the rear disk gang assembly is experiencing a hearing failure condition. In contrast, if the front disk gang assembly has experienced a significant increase in loading relative to the rear disk gang assembly (e.g., due to a bearing failure condition), such increase in loading would result in the load differential between the gang assemblies exceeding the maximum load differential 160 for the expected load differential range, thereby indicating that the front disk gang assembly is experiencing a bearing failure condition.

Referring back to FIG. 4, as indicated above, the computing system 110 may be configured to monitor the loads applied through the disk gang assemblies 44 of an implement to identify when one of such gang assemblies 44 is experiencing a bearing failure condition. Moreover, when it is determined that a given disk gang assembly 44 is experiencing a bearing failure condition, the computing system 110 may be further configured to automatically initiate one or more control actions. For example, the computing system 110 may be configured to provide the operator with a notification that a disk gang assembly 44 is experiencing a bearing failure condition. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication that a given disk gang assembly is experiencing a bearing failure condition. In such instance, the operator may then choose to initiate any suitable corrective action he/she believes is necessary, such as adjusting the ground speed of the implement 10 (including bringing the implement to a stop).

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the ground speed of the implement 10 to address the identified bearing failure condition, such as by actively controlling the engine 24 and/or the transmission 26 of the work vehicle 12 to safely bring the vehicle/implement to a stop.

Figure 6:
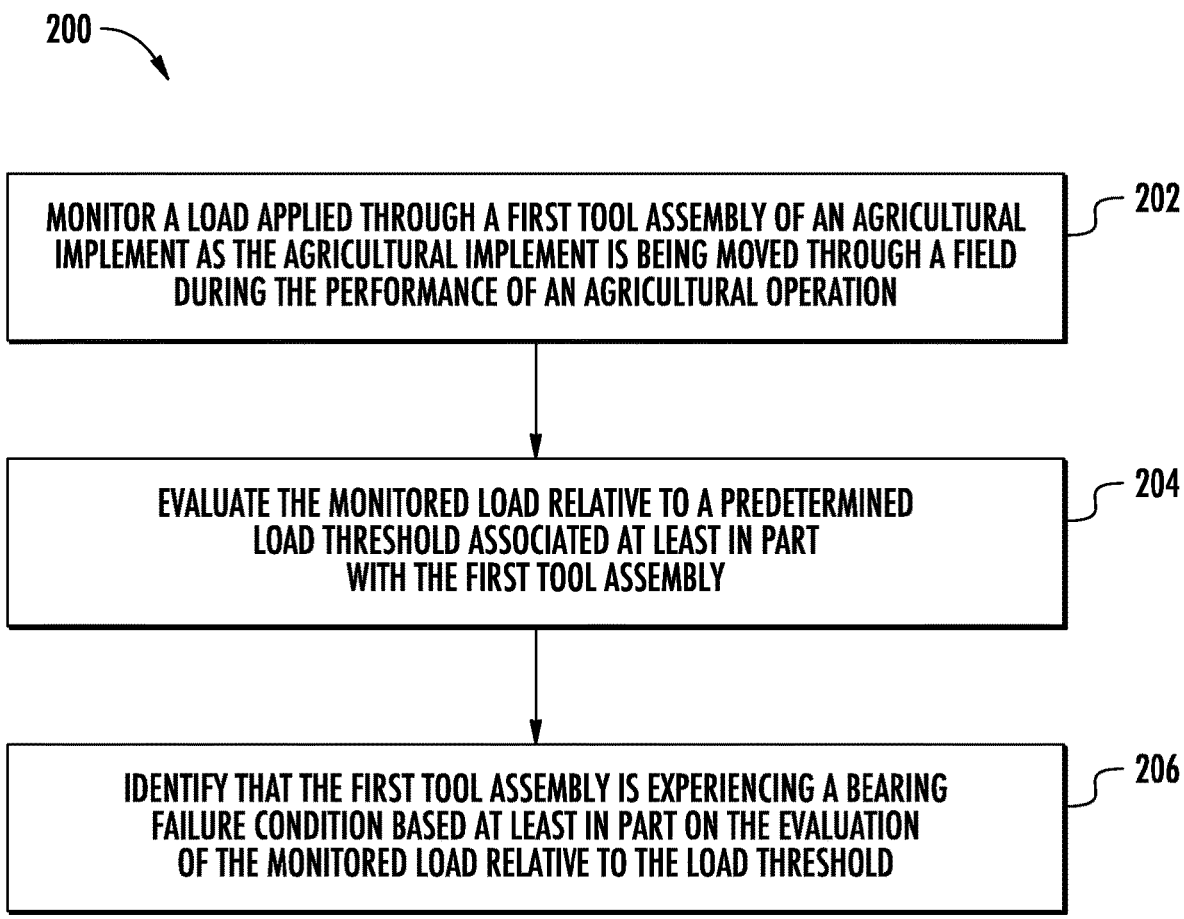
FIG. 6 illustrates a flow diagram of one embodiment of a method for detecting bearing failures for tool assemblies of an agricultural implement in accordance with aspects of the present subject matter.

Referring now to FIG. 6, a flow diagram of one embodiment of a method 200 for detecting a bearing failure for a tool assembly of an agricultural implement is illustrated in accordance with aspects of the present subject matter. In general, the method 200 will be described herein with reference to the agricultural implement 10, disk gang assemblies 44, and system 100 described above with reference to FIGS. 1-4. However, it should be appreciated by those of ordinary skill in the art that the disclosed method 200 may generally be utilized in association with agricultural implements having any suitable implement configuration, tool assemblies having any other suitable tool configuration (including different types of tool assemblies beyond disk gang assemblies), and/or systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include monitoring a load applied through a first tool assembly of an agricultural implement as the agricultural implement is being moved through a field during the performance of an agricultural operation. For instance, as indicated above, the computing system 110 may be communicatively coupled to one or more load sensors 80 configured to generate data indicative of an applied load through a given tool assembly, such as a given disk gang assembly 44. By receiving the data from the associated load sensor(s) 80, the computing system 110 may be configured to monitor the load applied through such tool assembly.

Additionally, at (204), the method 200 may include evaluating the monitored load relative to a predetermined load threshold associated at least in part with the first tool assembly. As described above, the computing system 110 may be configured to evaluate the monitored load applied through a given tool assembly relative to an associated load threshold. For instance, in one embodiment, the monitored load may be evaluated relative to a maximum load threshold selected for the tool assembly. Alternatively, the monitored load may be used to determine a load differential between the tool assembly and another tool assembly, which may then be evaluated relative to the minimum and maximum load differential thresholds associated with a predetermined load differential range for the selected pair of tool assemblies.

Moreover, at (206), the method 200 may include identifying that the first tool assembly is experiencing a bearing failure condition based at least in part on the evaluation of the monitored load relative to the load threshold. For instance, when the load threshold corresponds to a maximum load threshold, the computing system 110 may be configured to identify that the tool assembly is experiencing a bearing failure condition when the monitored load exceeds the maximum load threshold. Alternatively, when the load threshold corresponds to a load differential threshold associated with a predetermined load differential range, the computing system 110 may be configured to identify that the tool assembly is experiencing a bearing failure condition when the monitored load differential falls outside the corresponding load differential range and such event occurs as a result in an increase in the load applied to the tool assembly (e.g., an increase over a given period of time).

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting bearing failures for tool assemblies of agricultural implements, the system comprising:
   an implement frame;
   first and second tool assemblies supported relative to the implement frame, each of the first and second tool assemblies including at least one ground-engaging tool;

a first load sensor configured to generate data indicative of an applied load through the first tool assembly;

a second load sensor configured to generate data indicative of an applied load through the second tool assembly; and a computing system communicatively coupled to the first and second load sensors, the computing system being configured to:

monitor the loads applied through the first and second tool assemblies based on the data received from the first and second load sensors;

identify that one of the first tool assembly or the second tool assembly is experiencing a bearing failure condition based on an evaluation of the monitored loads applied through the first and second tool assemblies; and determine a direction of a moment resulting from the load applied through one of the first tool assembly or the second tool assembly.

2. The system of claim 1, wherein the computing system is configured to determine a load differential between the loads applied through the first and second tool assemblies and compare the load differential to a predetermined load differential range, the computing system being configured to identify that the one of the first tool assembly or the second tool assembly is experiencing a bearing failure condition when the load differential falls outside the predetermined load differential range.

3. The system of claim 1, wherein the implement frame comprises a first lateral side and a second lateral side defined relative to a longitudinal centerline of the implement frame, and wherein the first and second tool assemblies are positioned on one of the first lateral side or the second lateral side of the implement frame and one or more additional tool assemblies are positioned on the other of the first lateral side or the second lateral side of the implement frame, the computing system being configured to select the first and second tool assemblies for evaluation of the monitored loads as opposed to the one or more additional tool assemblies based on the direction of the moment.

4. The system of claim 1, wherein the first and second tool assemblies comprise first and second disk gang assemblies, respectively, each of the first and second disk gang assemblies including a toolbar coupled to the implement frame and a plurality of disks supported by the toolbar.

5. An agricultural implement, comprising:

an implement frame;

a plurality of disk gang assemblies supported relative to the implement frame, with each disk gang assembly including a toolbar coupled to the implement frame and a plurality of disks supported by the toolbar, the plurality of disk gang assemblies including a first disk gang assembly;

a first load sensor configured to generate data indicative of an applied load through the first disk gang assembly; and a computing system communicatively coupled to the first load sensor, the computing system being configured to:

monitor the load applied through the first disk gang assembly based on the data received from the first load sensor;

evaluate the monitored load relative to a predetermined load threshold associated at least in part with the first disk gang assembly;

identify that the first disk gang assembly is experiencing a bearing failure condition based at least in part on the evaluation of the monitored load relative to the load threshold; and select the load threshold based at least in part on a ground speed of the agricultural implement and a penetration depth of the plurality of disks of the first disk gang assembly.

6. The agricultural implement of claim 5, wherein the load threshold comprises a maximum load threshold, the computing system being configured to determine that the first disk gang assembly is experiencing the bearing failure condition when the monitored load exceeds the maximum load threshold.

7. The agricultural implement of claim 5, wherein the plurality of disk gang assemblies further comprises a second disk gang assembly, and wherein the agricultural implement further comprises a second load sensor configured to generate data indicative of an applied load through the second disk gang assembly, the computing system being configured to monitor the loads applied through the first and second disk gang assemblies based on the data provided by the first and second load sensors.

8. The agricultural implement of claim 7, wherein the predetermined load threshold comprises a load differential threshold forming part of a predetermined load differential range, the computing system being configured to determine a load differential between the loads applied through the first and second disk gang assemblies and compare the load differential to the predetermined load differential range, the computing system being configured to identify that the first disk gang assembly is experiencing a bearing failure condition when the load differential falls outside the predetermined load differential range due to an increase in the load applied through the first disk gang assembly.

9. The agricultural implement of claim 8, wherein the first disk gang assembly comprises a rear disk gang assembly of the agricultural implement, the second disk gang assembly comprises a front disk gang assembly, and the load differential threshold comprises a minimum load differential threshold for the predetermined load differential range, the computing system being configured to identify that the first disk gang assembly is experiencing a bearing failure condition when the load differential falls drops below the minimum load differential threshold.

10. The agricultural implement of claim 8, wherein the first disk gang assembly comprises a front disk gang assembly of the agricultural implement, the second disk gang assembly comprises a rear disk gang assembly, and the load differential threshold comprises a maximum load differential threshold for the predetermined load differential range, the computing system being configured to identify that the first disk gang assembly is experiencing a bearing failure condition when the load differential exceeds the maximum load differential threshold.

11. The agricultural implement of claim 5, wherein the implement frame comprises a first lateral side and a second lateral side defined relative to a longitudinal centerline of the implement frame, and wherein the first disk gang assembly is positioned on the first lateral side of the implement frame and the plurality of disk gang assemblies further comprises one or more additional disk gang assemblies positioned on the second lateral side of the implement frame, the computing system being configured to determine a direction of a moment resulting from the load applied through one of the first disk gang assembly or the second disk gang assembly, the computing system being further configured to select the first disk gang assembly for evaluation of the monitored loads as opposed to the one or more additional disk gang assemblies based on the direction of the moment.

12. A method for detecting bearing failures for tool assemblies of agricultural implements, the method comprising:
   monitoring, with a computing system, a load applied through a first tool assembly of an agricultural implement as the agricultural implement is being moved through a field during the performance of an agricultural operation;
   monitoring, with the computing system, a load applied through a second tool assembly of the agricultural implement;
   determining, with the computing system, a load differential between the loads applied through the first and second tool assemblies;
   evaluating, with the computing system, the monitored loads relative to a predetermined load threshold associated with the first tool assembly and the second tool assembly, wherein the predetermined load threshold comprises a load differential threshold forming part of a predetermined load differential threshold, and wherein evaluating the monitored load relative to the predetermined load threshold comprises comparing the load differential to the predetermined load differential threshold; and
   identifying, with the computing system, that the first tool assembly is experiencing a bearing failure condition based at least in part on the evaluation of the monitored load relative to the load threshold, wherein identifying that the first tool assembly is experiencing the bearing failure condition comprises identifying that the first tool assembly is experiencing the bearing failure condition when the load differential falls outside the predetermined load differential range due to an increase in the load applied through the first tool assembly.

13. The method of claim 12, wherein the predetermined load threshold comprises a maximum load threshold, and wherein identifying that the first tool assembly is experiencing the bearing failure condition comprises identifying that the first tool assembly is experiencing the bearing failure condition when the monitored load exceeds the maximum load threshold.

14. The method of claim 12, wherein the first tool assembly comprises a rear tool assembly of the agricultural implement, the second tool assembly comprises a front tool assembly positioned forward of the rear tool assembly relative to a direction of travel of the agricultural implement, and the load differential threshold comprises a minimum load differential threshold for the predetermined load differential range, wherein identifying that the first tool assembly is experiencing the bearing failure condition comprises identifying that the first tool assembly is experiencing the bearing failure condition when the load differential drops below the minimum load differential threshold.

15. The method of claim 12, wherein the first tool assembly comprises a front tool assembly of the agricultural implement, the second tool assembly comprises a rear tool assembly positioned aft of the front tool assembly relative to a direction of travel of the agricultural implement, and the load differential threshold comprises a maximum load differential threshold for the predetermined load differential range, wherein identifying that the first tool assembly is experiencing the bearing failure condition comprises identifying that the first tool assembly is experiencing the bearing failure condition when the load differential exceeds the maximum load differential threshold.

16. The method of claim 12, wherein the agricultural implement comprises a first lateral side and a second lateral side defined relative to a longitudinal centerline of an implement frame of the agricultural implement, and wherein the first tool assembly is positioned on the first lateral side of the agricultural implement and the agricultural implement further comprises one or more additional tool assemblies positioned on the second lateral side of the agricultural implement, the method further comprising:
   determining a direction of a moment resulting from the load applied through the first tool assembly; and
   selecting the first tool assembly for evaluation of the monitored loads as opposed to the one or more additional tool assemblies based on the direction of the moment.

17. The method of claim 12, further comprising initiating a control action when it is determined that the first tool assembly is experiencing the bearing failure condition.

* * * * *